Sept. 20, 1966  N. F. GUBITOSE ET AL  3,273,989
APPARATUS FOR ASSEMBLING SWITCHES
Filed Dec. 20, 1963  6 Sheets-Sheet 6
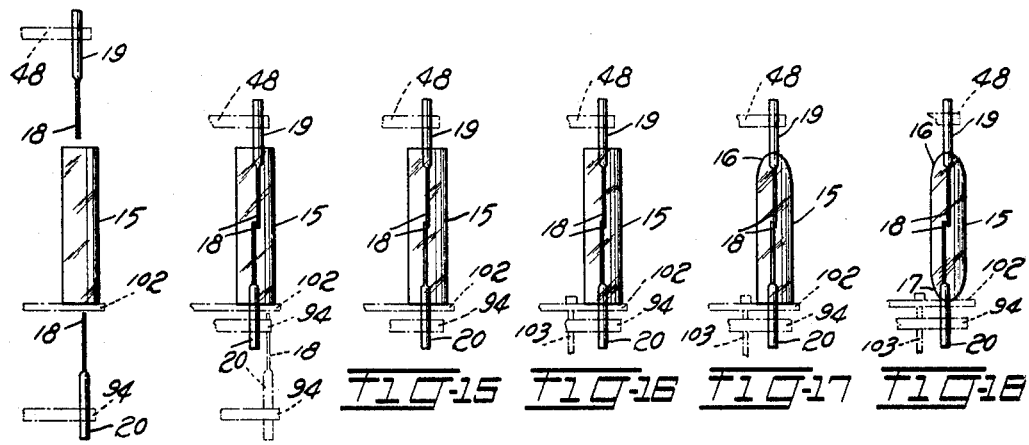
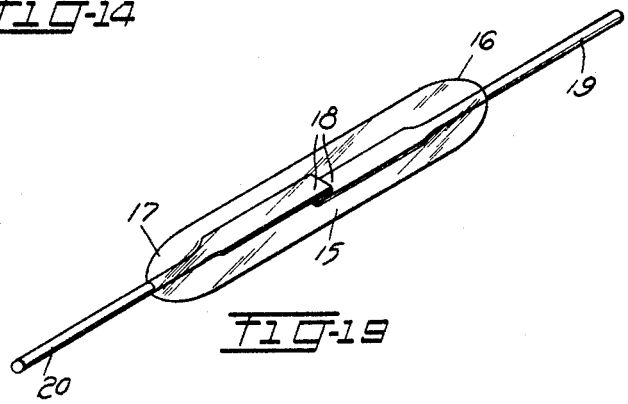
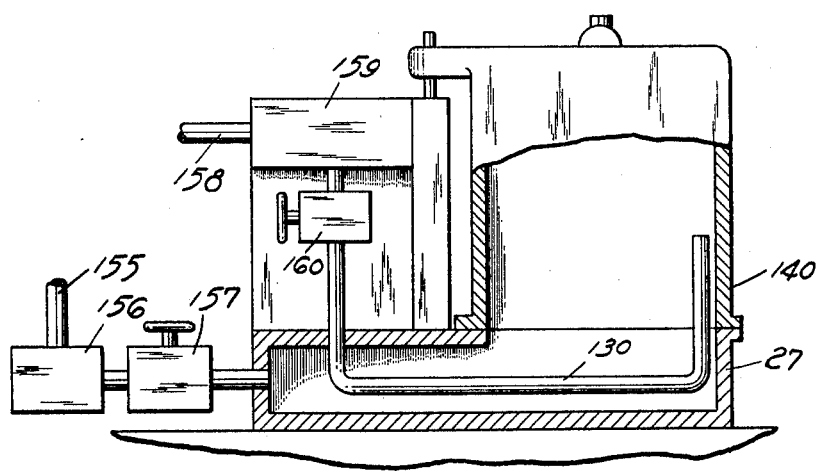

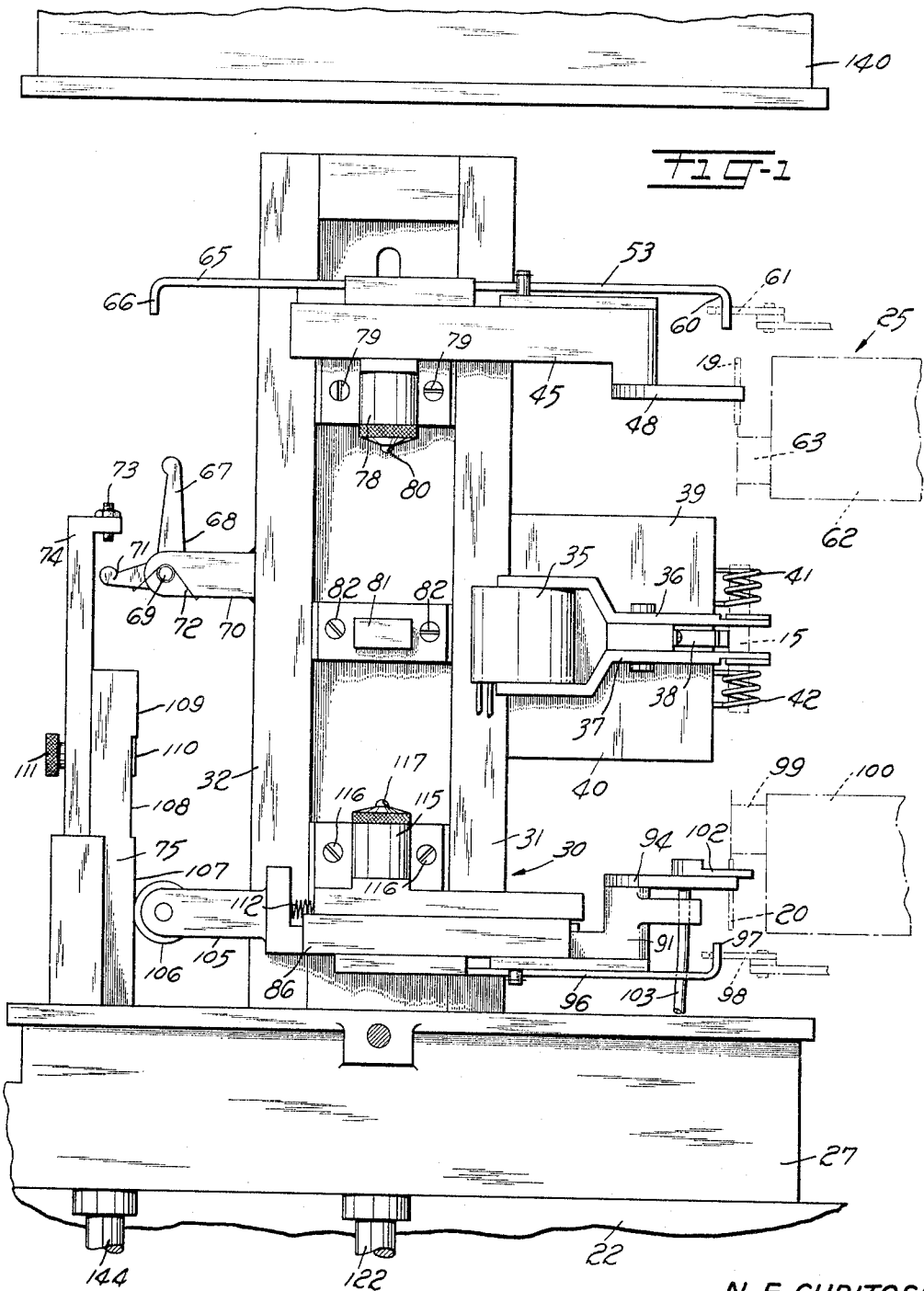

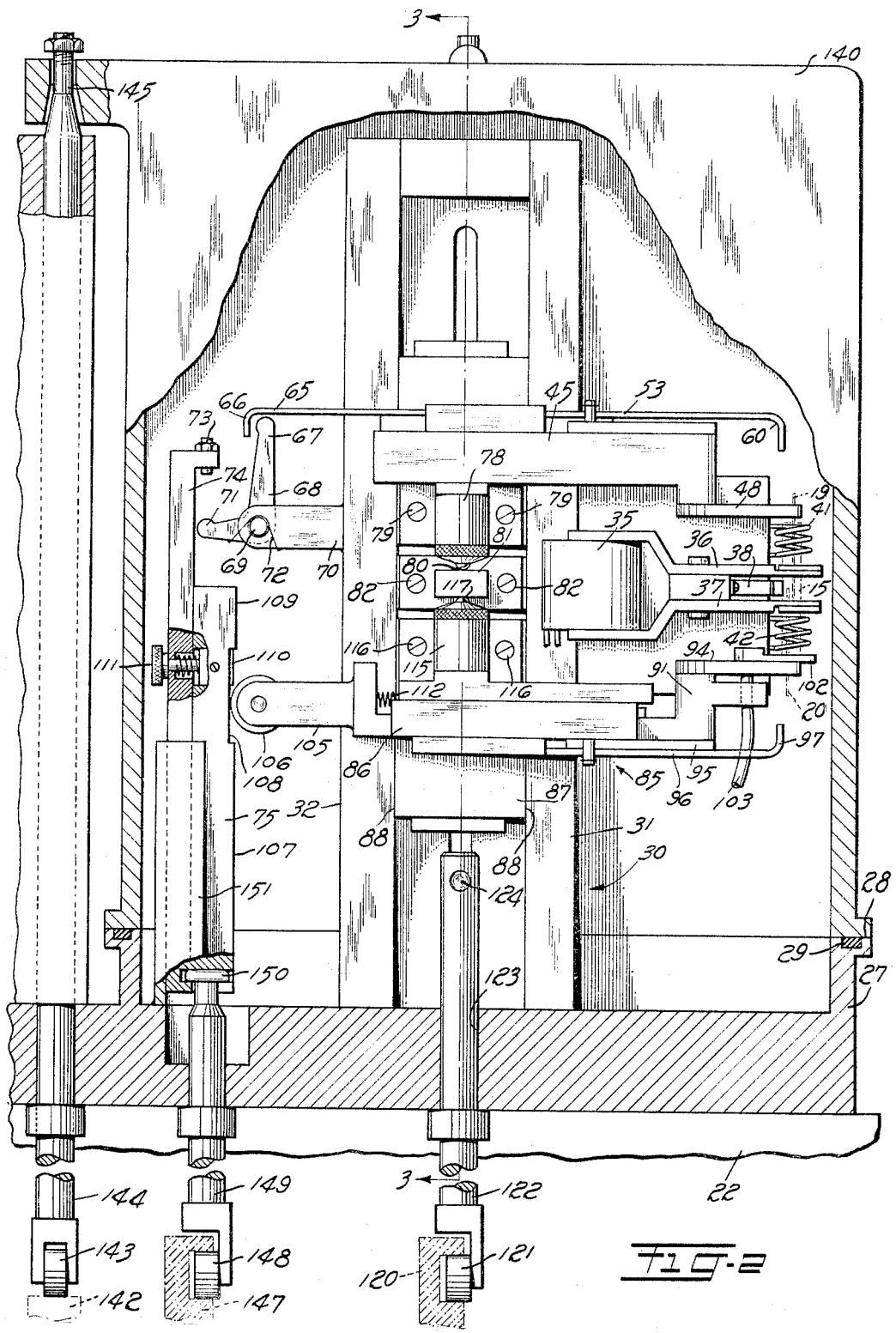

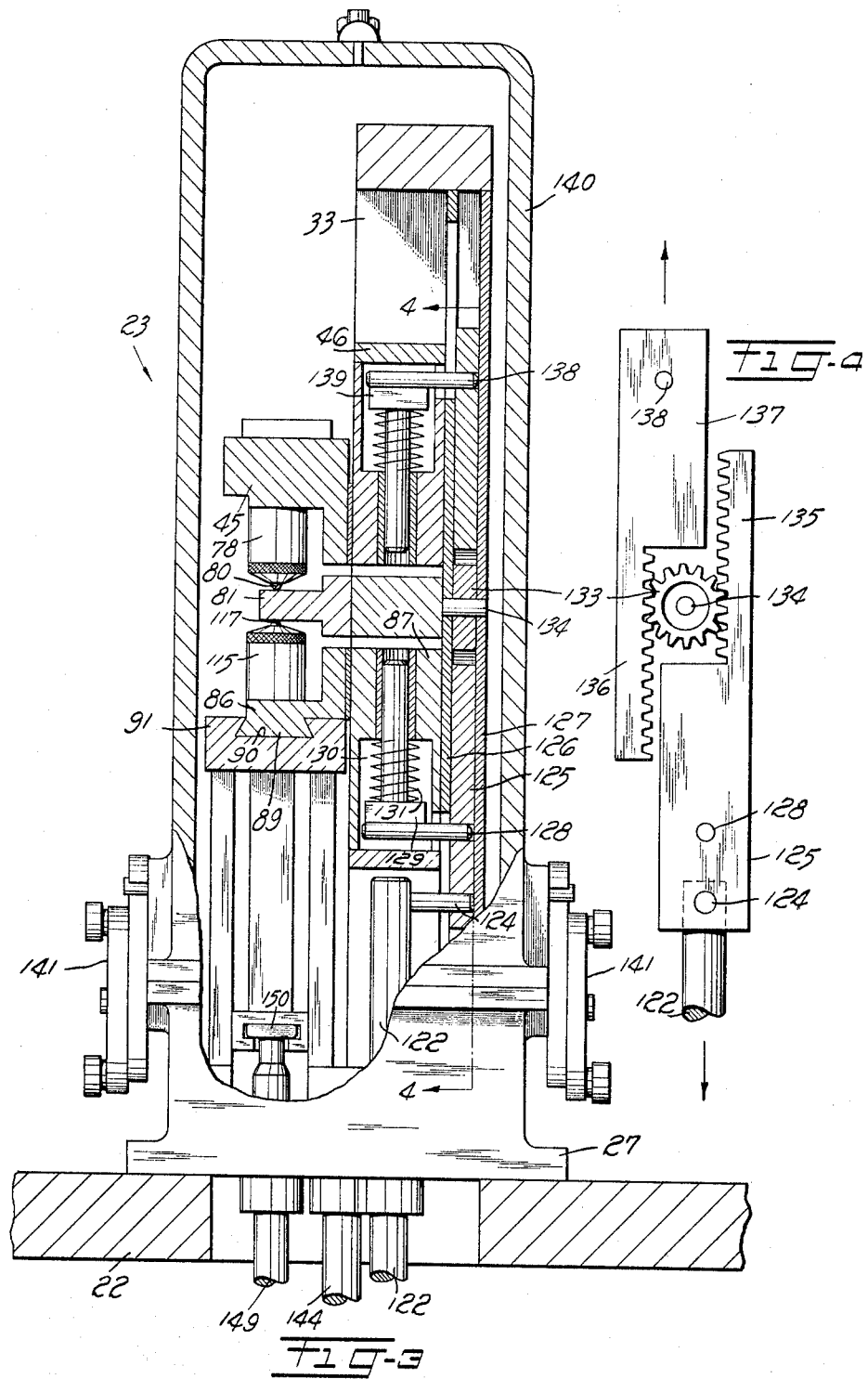

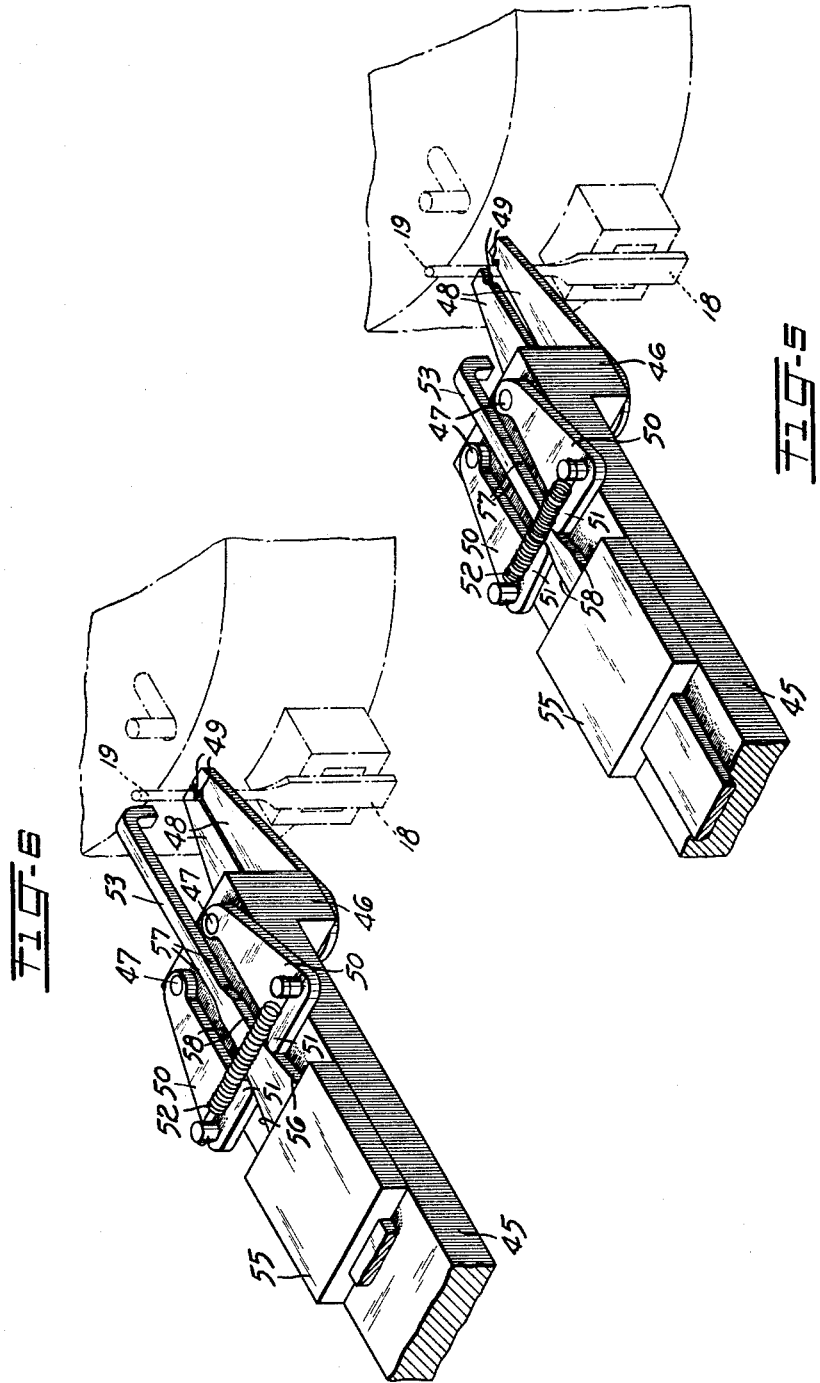

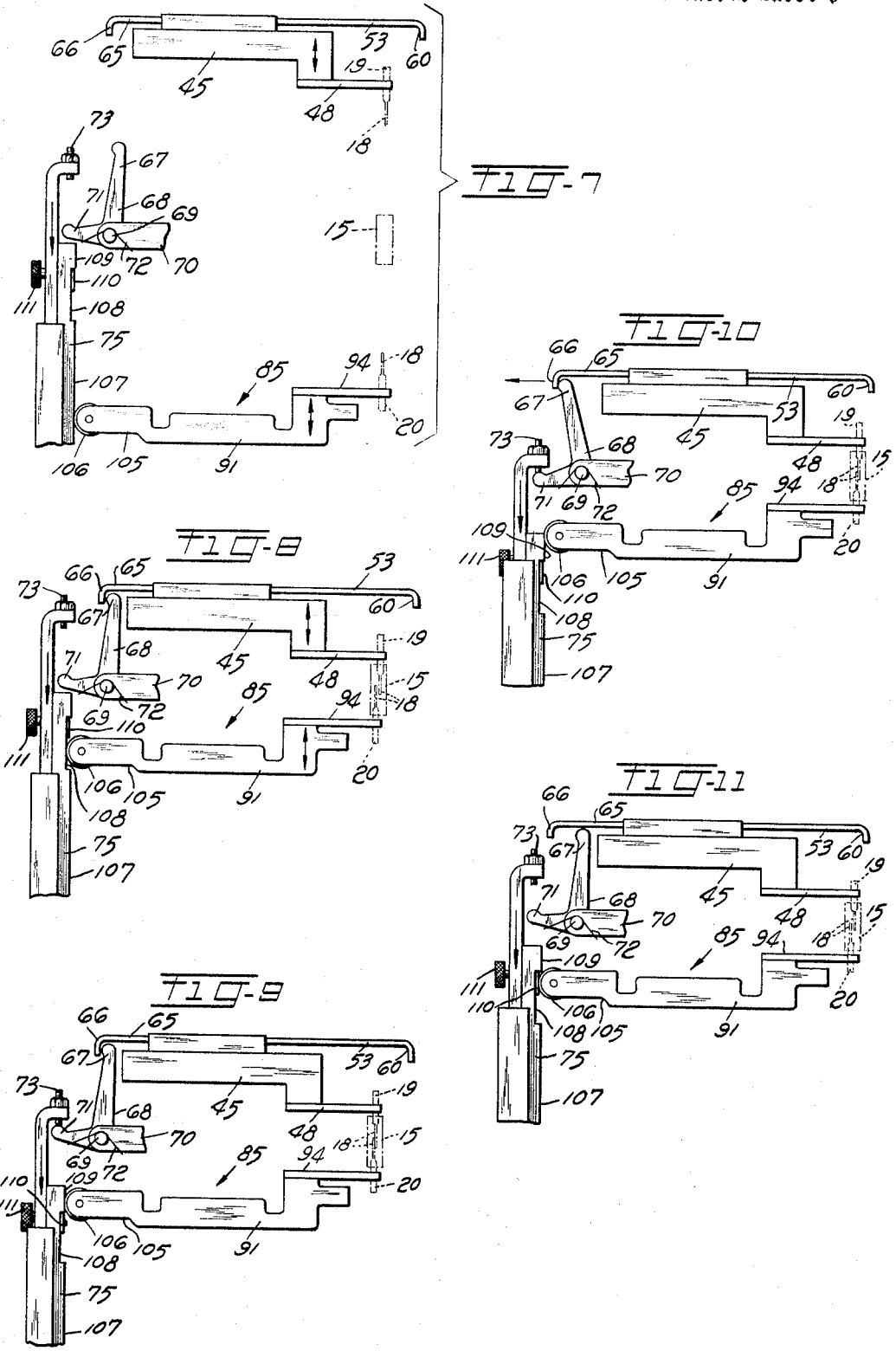

United States Patent Office 3,273,989
Patented Sept. 20, 1966

3,273,989
APPARATUS FOR ASSEMBLING SWITCHES
Nicholas F. Gubitose, Emmaus, and Jack J. Monahan, Allentown, Pa., assignors to Western Electric Company Incorporated, New York, N.Y., a corporation of New York
Filed Dec. 20, 1963, Ser. No. 332,101
11 Claims. (Cl. 65—154)

This invention relates to apparatus for assembling switches, particularly switches composed of pairs of contacts with overlapping end portions sealed in glass sleeves.

There are machines such as that disclosed in R. F. Brewer et al. 3,061,144 for making switches of this type. However, these machines bring about the assembly of the switches in the open. It has been found advantageous to assemble each switch in a sealed chamber and under predetermined air pressure. To accomplish these results drastic changes had to be made from the teachings of the machines in this particular art.

An object of the invention is an apparatus which is highly efficient in receiving parts for switches and assembling them in sealed chambers and under predetermined pressures.

In accordance with the object, the apparatus includes units advanced intermittently relative to a feeding station, each unit comprising a housing with an open top having a vertical carriage frame mounted therein and extending upwardly through the top so that it may support a chuck for a glass sleeve at a fixed position, and upper and lower carriages for upper and lower gripping jaws to receive and hold upper and lower contacts for the switch. A hood is adapted to close the open top of the housing and cooperate with the housing to form a closed chamber to completely enclose the carriage frame and the structure supported thereby so that the switch may be assembled under a predetermined pressure.

Other objects and advantages will be apparent from the following detailed description when considered in conjunction with the accompanying drawings wherein:

FIG. 1 is a side elevational view of one of the units with the hood in the open position at the feeding station;

FIG. 2 is a vertical sectional view of the units with the hood shown in closed position;

FIG. 3 is a vertical sectional view taken substantially along the line 3—3 of FIG. 2;

FIG. 4 is a fragmentary sectional view taken substantially along the line 4—4 of FIG. 3;

FIG. 5 is a fragmentary isometric view of the upper gripping jaws at the feeding stations shown in open position;

FIG. 6 is substantially identical to FIG. 5 showing the upper jaws in closed position;

FIG. 7 is a schematic illustration of the carriages for the contacts shown in open receiving positions with the gripping jaws and contacts aligned;

FIG. 8 is a schematic illustration of the structure shown in FIG. 7 with the carriages in closed position and the lower carriage moved laterally to offset the lower contact from the upper contact;

FIG. 9 illustrates the structure shown in FIG. 8 with the lower carriage moved outwardly laterally to move the lower contact into engagement with the upper contact;

FIG. 10 illustrates the structure shown in FIG. 9 with the control element causing opening of the upper gripping jaws;

FIG. 11 illustrates the structure of FIG. 10 with the control element causing the lower carriage to set the gap between the contacts;

FIG. 12 is a schematic view of the unit illustrating the gas and air controls;

FIGS. 13 to 18 inclusive are schematic illustrations of various assembling steps carried out by the unit; and FIG. 19 is an isometric view of the finished switch.

The product of the apparatus, shown in FIG. 19, is a glass sleeve 15 sealed at its top and bottom ends 16 and 17 and enclosing therein accurately spaced overlapping inner flat surfaced ends 18 of upper and lower contacts 19 and 20.

*Apparatus in general*

The present apparatus is composed of a turret 22 mounted for rotation intermittently about its axis in a conventional manner and having a number of units 23 (FIG. 3) disposed at spaced positions about its axis so that during the intervals of rest of the turret the units will be moved successively into a feeding station, indicated generally at 25, FIG. 1. Prior to reaching the feeding station a unit is opened and previously completed switches are ejected therefrom. At station 25 the unit is ready to receive the switch parts, namely, the sleeve 15 and the upper and lower contacts 19 and 20 for the next switch assembly. The switch parts are moved into their respective positions, whereupon the unit is enclosed and filled with air at a given pressure to permit subsequent operations for completing the assembly of the switch in a predetermined order.

*Detailed structure of the apparatus*

The various units 23 are identical in structure and function and for this reason, only one of the units is shown in the drawings. The unit illustrated, particularly in FIGS. 1 to 4, inclusive, has a housing 27 mounted on the turret 22, and provided with a normally open top 28 which is recessed to receive a sealing ring 29. A frame 30, mounted in the housing 27, extends upwardly in the form of parallel vertical members 31 and 32 joined at their tops and having V-shaped grooves 33 along their inner surfaces. An electromagnet 35 is fixedly mounted on the vertical member 31 with pole members 36 and 37 thereof extending outwardly to positions where apertures are provided therein for receiving a glass sleeve. A chuck 38, composed of leaf-spring members is adapted to engage and hold the glass sleeve 15 in the apertures of the pole members. Dielectric blocks 39 and 40 are also mounted on the vertical member 31 for supporting respective upper and lower heating coils 41 and 42 to be used in sealing the upper and lower ends of the glass sleeve.

An upper carriage 45 has a portion 46 (FIG. 3) interposed between the vertical members 31 and 32 and provided with side surfaces (not shown) which are V-shaped to engage and be guided by the V-shaped inner surfaces 33 of the vertical members 31 and 32. Gripping jaws 48 are fixedly mounted on the lower ends of spindles 47 (FIGS. 5 and 6), the jaws being of the contour shown with V-shaped notches 49 therein to receive and grip the upper contact 19. Levers 50 are fixedly mounted on the upper ends of the spindle 47 and have portions 51 with rounded ends which may be described as cam followers in that through the aid of a connecting spring 52, these portions are caused to follow surfaces of a cam 53. The cam 53 rests on the upper surface of the carriage 45 and is guided for longitudinal movement by a member 55 fixed to the carriage. The cam 53 has surfaces 56 adapted to actuate the gripping jaws 48 into a closed position, surfaces 57 adapted to open the jaws wide to receive the contact 19, and intermediate surfaces 58 to cause partial opening of the jaws to free the upper contact 19 during certain intervals of the switch assembly.

The cam 53, on the upper carriage 45, has a downwardly extending hook-portion 60 adapted to be engaged at the feeding station 25 (FIG. 1) by an actuator 61 operated by suitable means (not shown) to move the cam from the position shown in FIG. 5 where the gripping jaws 48 are held in open position, to receive the top contact 19, to the closed position shown in FIG. 6 where the gripping jaws will firmly grip the upper portion of the top contact. A feeder 62, which is the subject matter of a copending application of J. J. Monahan, Serial No. 372,618, filed June 4, 1964, receives the top contacts 19 successively on a magnetic member 63 and moves this member longitudinally to locate successive upper contacts into the open gripping jaws 48 as illustrated in FIG. 5.

As seen in FIG. 2, the cam 53 has a projection 65 with a hook portion 66 positioned to be engaged by a vertical arm 67 of a lever 68 pivotally supported at 69 by a bracket 70 mounted on the vertical frame member 32. Another arm 71, of the lever 68, is adaptable for engagement by an adjustable member 73 carried by a projection 74 of a control element 75 to rock the lever 68 against the force of a spring 72. In turn, the arm engages and moves the hook portion 66 of the cam 53 until the portions 51 of the levers 50 (FIG. 6) engage the intermediate cam-portions 58 and thus partially open the gripping jaws 48 to release the upper contact 19.

The upper carriage 45 has a micrometer 78 mounted at 79 thereon and adapted to measurably adjust a member 80 to control location of the carriage 45 in its closed or down position so as to accurately position the upper contact 19 relative to the sleeve 15 and the lower contact 18 when the member engages the upper surface of a fixed stop 81. The fixed stop 81 is mounted at 82—82 between the vertical members 31 and 32 of the frame 30.

As seen in FIG. 2, a lower carriage, indicated generally at 85, will be described as being movable vertically and laterally and to accomplish this result, a member 86 is supported on a guide 87 provided with V-shaped ends 88 receivable in the V-shaped grooves of the guide surfaces 33 of the vertical frame members 31 and 32. The member 86 has a dovetail lower portion 89 receivable in a dovetail groove 90 of a carriage member 91. The carriage member 91, through this connection, is moved vertically with the member 86 and laterally or horizontally to bring about certain functions necessary regarding the lower contact 20. Lower gripping jaws 94, identical in structure to the gripping jaws 48 and provided with the same type of operating levers 95 mounted on opposing ends of spindles (not shown), are provided with a cam 96 similar in structure and operation to the cam 53 with the exception of the intermediate cam portions 58 present on the cam 53, but absent from the cam 96. The cam 96 is provided with an upwardly extending hook 97 operated at the feeding station by an actuator 98, similar to the actuator 61, to cause closing of the gripping jaws 94 after they have received a lower contact 20 from a magnetic member 99 (FIG. 1) of a feeding unit 100 associated with the feeding unit 62.

The ejection of finished switches from the apparatus prior to reaching the feeding station are not shown and are not to be considered a part of this structure, but it should be understood that such a mechanism is provided to open the gripping jaws 48 and 94 for the complete removal of the finished switch prior to the unit being described reaching the feeding station 25. Furthermore, the means for feeding the glass sleeves 15 singly to the apparatus is not shown but is embodied in the aforementioned copending application.

The member 91, of the lower carriage 85, supports a nozzle 102 on which the lower end of the glass sleeve 15 may rest and is provided with a plurality of apertures (not shown) for directing a forming gas into the sleeve from a supply line 103. A bifurcated member 105, mounted on the other end of the carriage member 91, supports a roller 106 adapted to engage surfaces 107, 108, and 109 of the control element 75 and a surface of a variable member 110 whose position is controlled by an adjustable member 111 for use in setting the gap between the overlapping inner ends 18—18 of the contacts 19 and 20. A spring 112 normally urges the member 91 to the left causing its roller 106 to engage any of the surfaces 107, 108, 109 or 110 presented thereto.

The member 86, for the lower carriage 85, has a micrometer 115 mounted thereon at 116—116 and adapted to measurably adjust a member 117 for controlling location of the lower carriage in its closed or up position to accurately position the lower contact 20 relative to the sleeve 15 and the upper contact 19 when the member 117 engages the under surface of the fixed stop 81.

As seen in FIG. 2, the means for vertically moving the carriages 45 and 85 originates with a circular grooved cam 120, mounted beneath the turret 22 and in which a cam follower or roller 121 is positioned to ride. The roller 121 is supported by a cam rod 122 movable vertically through aperture 123 of the housing 27 and having a supporting pin 124 adjacent its upper end. The pin 124, as shown in FIG. 3, extends laterally into an aperture of a rack 125. The rack 125 is supported for vertical movement between guide walls 126 and 127 fixed at spaced positions to the vertical members 31 and 32 of the frame 30. The rack 125 supports a pin 128, which in turn, supports a plunger 129 disposed in a hollow portion 130 of the guide 87 for the lower carriage 85. A spring 131, interposed between a head of the plunger 129 and an inner surface of the guide 87 serves to cushion action imparted to the plunger by the rack 125. A pinion 133, mounted on a fixedly positioned shaft 134 and in mesh with a tooth-portion 135 of the rack 125 and a tooth portion 136 of a rack 137, serves to cause the rack 137 to move in vertical reverse directions with respect to the rack 125 when motion is imparted to the rack from the cam 120. A pin 138, of the rack 137, engages a spring-pressed plunger 139 disposed in a hollow portion of the enlarged end 46, which may be described as a guide portion for the upper carriage 45. The spring-pressed plungers 129 and 139 follow the movements of their racks and cushion the movement of the carriages 45 and 85 into the closed position shown in FIG. 3. The cam 120 provides the controlling force to move the rack 125 upwardly during closing of the carriages, the rack 125 acting on the lower carriage through the pinion 133 to cause the upper rack 137 to produce the same, but reverse motion, to the upper carriage for bringing them into simultaneous open and closed positions, respectively.

A hood 140, of the contour shown, is adapted to cooperate with the housing 27, when resting on the sealing ring 29, to completely enclose all of the mechanism extending into and above the housing. Locking units 141, the subject matter of a copending application of J. J. Monahan, Serial No. 320,296, filed Oct. 31, 1963, now abandoned serve to add sealing force to the hood during the interval the hood is to remain closed while the switch is assembled. As seen in FIG. 2, an annular cam 142, through a cam follower 143 and a cam rod 144 connected to the hood at 145, is adapted to move the hood into the open position shown in FIG. 1 prior to the unit reaching the feeding station 25 and to lower the hood into the closed position, shown in FIGS. 2 and 3 after leaving the feeding station. Another cam 147 is provided to cause a cam follower 148 and a cam rod 149, connected at 150 to the control element 75, to impart desired movements to the control element relative to its guide 151.

When the hood 140 is closed and sealed, air under pressure from a supply line 155, FIG. 12, is directed through a filter 156 and a control valve 157 into a chamber composed of the inter-portions of the housing 27 and the hood 140. In the present instance, filtered air at twenty pounds per square inch fills the chamber. At the same time, or during the assembly of the switch, which includes an interval prior to the sealing off of the upper end of the glass sleeve, a forming gas of twenty-seven pounds per square inch is forced from a supply line 158 through a control unit 159, a control valve 160 and line 130 to the nozzle 102 where the forming gas will be directed upwardly through the sleeve.

Operation

As the unit approaches the feeding station 25, the hood is opened, the previously assembled switch has been removed, the controls for the air and gas have been closed. The cam 120 has caused downward movement of the rack 125 and, through the pinion 133, upward movement of the rack 137 to move the carriages with their gripping jaws into open position as shown in FIG. 1. Furthermore, means (not shown) utilized in freeing the completed switch have moved the cams 53 and 96 into positions to cause opening of the gripping jaws 48 and 94 to receive their respective upper and lower contacts 19 and 20. When the turret, with the unit in this condition, reaches the feeding station 25, the glass sleeve 15, through means (not shown) is fed into the coils 41 and 42 through the openings in the outer ends of the pole members 36 and 37 where it is held by the chuck 38. At the same time, the magnetic members 63 and 99 feed their respective upper and lower contacts 19 and 20 between the open jaws 48 and 94 after which the means 61 and 98 (FIG. 1) are actuated to move the cams 53 and 96 to close their respective jaws 48, 94. The parts for the new switch having been fed to the unit, the unit starts its movement away from the feeding station 25. When it leaves the feeding station, the cam 142 (FIG. 2) functions to cause closing of the hood 140 and after it is closed the locks 141 are operated to lock the hood in the closed position. At this time, the chamber within the hood and housing having been closed and sealed through suitable controls (not shown), the chamber may be filled with the filtered air of given pressure and the forming gas may be directed through the line 130, the nozzle 102 and the glass sleeve 15.

Attention is now directed to the illustration of FIGS. 7–11, inclusive. When the parts for the switch are initially fed to the unit, they are disposed in alignment with each other. The upper contact 19 is held in a given position in vertical alignment with substantially the center of the sleeve 15. At that time, the roller 106 of the lower carriage engages the surface 107 of the control element 75 and the lower contact 20 is located in alignment with the upper contact 19. However, during closing of the carriages 45 and 85, the roller 106 of carriage member 91 is urged into the recessed surface 108 of the moving control member 75, thereby allowing this portion of the lower carriage to retract laterally. In turn, the lower jaws 94 are moved laterally a distance sufficient to move the lower contact 20 from the path of the upper contact and thereby permit the inner ends 18 of the contacts to overlap each other. Immediately following this action, continued vertical movement of the control element 27 causes the portion 91 of the lower carriage 85 to move in a reverse direction, as illustrated in FIG. 9 due to the roller 106 engaging the surface 109 of the control element 75. This results in the lower contact 20 contacting the adjacent overlapping inner portion of the upper contact 19. Shortly following this action, the electromagnet 35 is energized causing its pole members 36 and 37 to magnetically attract the overlapping ends 18—18 of the contacts 19 and 20 to each other. The cam 53 is operated to partially open the upper jaws through the movement of the control element 75 which causes the adjustable member 73 to engage the lower arm 71 of the lever 68 so that the upper arm 67 will engage the portion 66 and move the cam a given distance. As seen in FIG. 6, the upper jaws 48 may be moved into partially open position, by locating the intermediate portions 58 of the cam 53 between the ends 51 of the levers 50, to free the upper contact 19 so that it may be oriented relative to the lower contact and be supported solely thereby. The overlapping portions 18—18 of the contacts are flat surfaced and it is important that these flat surfaces lie parallel with each other in the finished switch.

The upper contact 19 remains supported by the lower contact when the upper coil 41 is energized to soften and seal the upper end of the glass sleeve the forming gas continuously passing through and then into the sleeve after the contact 19 is sealed to the sleeve. After completion of the upper seal the contact 19 is supported solely by its seal with the glass sleeve. The electromagnet is deenergized allowing free movement of the lower contact to set a predetermined gap between the contacts. This gap setting is under the control of the outer surface of the member 110, which is adjustable by member 111. This action is brought about through the control of the cam 147 imparting movement to the control element 75 which, in turn, brings the surface of the member 110 in registration with the roller 106, as illustrated in FIG. 11. After the gap is set, the lower coil 42 is energized to soften and seal the lower end of the glass sleeve to contact 20, the forming gas continuously passing through the glass sleeve until the seal is completed. These various actions are made necessary for the location of the contacts in the glass sleeve, the orientation of the upper contact relative to the lower contact, the maintenance of this condition during the sealing of the upper end of the sleeve through the assistance of the electromagnet, the subsequent setting of the gap, the sealing of the lower end of the sleeve about the accurately positioned lower contact in a sealed chamber under given air pressure, and continuous application of forming gas into the glass sleeve until the switch is completed, all this being brought about in a completely sealed chamber including the housing 27 and the hood 140. It has proven satisfactory and more advantageous to bring about the forming of a switch of this type in a sealed chamber and under the given air pressure. If a switch were made in normal atmosphere, a vacuum would be created in the switch, caused by a cooling of the air inside the switch. This condition is undesirable, due to the fact that electrons move freer in a vacuum, and due to the fact that the gap between the contacts is relatively small, thereby resulting in an undesirable voltage breakdown point. Thus, the switch is made in a pressurized chamber of 20 p.s.i. to offset this condition. As a result the pressure in the switch is at least atmospheric or something greater, causing the voltage breakdown to be at a more desirable figure.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. In an apparatus for assembling a switch having a pair of contacts extending within a glass sleeve, an assembly unit which comprises:
   a housing with an open top,
   a carriage frame mounted in the housing and extending upwardly through the open top,
   a stationary chuck mounted at a given position on the frame for receiving a glass sleeve,
   upper and lower gripping jaws for receiving upper and lower contacts for the switch,
   upper and lower carriages for the upper and lower gripping jaws disposed respectively above and below the stationary chuck and supported for simultaneous opposing movement relative to each other by the carriage frame,
   means cooperatively associated with the lower carriage to support the lower gripping jaws for lateral movement,
   heating coils supported by the carriage frame and disposed respectively above and below the chuck and in substantial axial alignment therewith to receive the ends of the glass sleeve and cause sealing of the ends of the sleeve at given intervals, means disposed at the feeding station to feed upper and lower contacts to the upper and lower jaws and a glass sleeve into the heating coils and the chuck, means for simultaneously advancing the carriages to locate the upper and lower jaws in a position to receive their respective upper and lower contacts and to retract the carriages to locate the jaws in a position such that they are in substantial alignment with the stationary chuck, means for moving the carriages simultaneously for causing the upper and lower jaws to move in opposing relationship towards the chuck for locating the inner ends of their respective contacts in the glass sleeve, means for moving the lower carriage laterally to cause the lower jaws to move the lower contact out of alignment with the upper contact and thereby position the inner ends of the contacts in overlapping relationship, a hood, means to open the hood prior to the unit entering a feeding station for receiving the contacts and glass sleeve, means to close the hood after the unit leaves the feeding station, the hood closing the open top of the housing and cooperating with the housing, when closed, to completely enclose the frame and structure therein, means to move the carriages relative to each other for positioning the jaws to receive their contacts and to return the carriages to positions toward the chuck to locate the inner ends of the contacts in overlapping positions in the glass sleeve, and means operable to move the lower carriage laterally to cause the lower jaws to move the lower contact out of alignment with the upper contact as they are moved into an overlapping position.

2. In an apparatus for assembling switches according to claim 1 having:
means operable to force air under a given pressure into the closed housing and hood.

3. In an apparatus for assembling switches according to claim 1 having:
means operable to force air under a given pressure into the closed housing and hood,
means for energizing the heating coils at different intervals to first cause sealing of the upper end of the sleeve and then the lower end of the sleeve, and
means to force a forming gas into the sleeve under a pressure relatively higher than the pressure of the air in the housing and hood.

4. In an apparatus for assembling switches according to claim 1 having:
means operable to force air under a given pressure into the closed housing and hood,
an electromagnet supported by the frame adjacent the chuck and adapted when energized to cause the overlapping inner ends of the contacts to be attracted to each other, and
means for opening the upper jaws to free the upper contact therefrom, said upper contact being solely supported by the magnetic attraction of the electromagnet with the lower contact.

5. In an apparatus for assembling switches according to claim 1 having:
a fixed stop with opposing surfaces for the carriages supported by the frame and disposed in general alignment with the chuck between the carriages, and
micrometer adjustable elements supported by the carriages to engage the opposing surfaces of the fixed stop to cause the jaws to locate the inner ends of the contacts in predetermined overlapping relationship in the sleeve.

6. In an apparatus for assembling switches according to claim 1 having:
a fixed stop with opposing surfaces for the carriages supported by the frame and disposed in general alignment with the chuck between the carriages,
micrometer adjustable elements supported by the carriages to engage the opposing surfaces of the fixed stop to cause the jaws to locate the inner ends of the contacts in predetermined overlapping relationship in the sleeve,
an electromagnet supported by the frame adjacent the chuck and adapted when energized to cause the overlapping inner ends of the contacts to be attracted to each other, and
means for opening the upper jaws to free the upper contact therefrom, said upper contact being solely supported by the magnetic attraction of the electromagnet with the lower contact.

7. In an apparatus for assembling switches according to claim 1 having:
means operable to force air under a given pressure into the closed housing and hood,
means for energizing the heating coils at different intervals to first cause sealing of the upper end of the sleeve and then the lower end of the sleeve,
means to force a forming gas into the sleeve under a pressure relatively higher than the pressure of the air in the housing and hood,
an electromagnet supported by the frame adjacent the chuck and adapted, when energized, to cause the overlapping inner ends of the contacts to be attracted to each other,
means for opening the upper jaws to free the upper contact therefrom, said upper contact being supported solely by the magnetic attraction of the electromagnet with the lower contact, and
means operable to move the lower carriage laterally to cause the lower jaws to move the lower contact away from the upper contact after sealing of the upper end of the sleeve therewith to set a given gap between the overlapping ends of the contacts prior to sealing the lower end of the sleeve.

8. In an apparatus for assembling switches according to claim 1 having:
means operable to force air under a given pressure into the closed housing and hood,
means for energizing the heating coils at different intervals to first cause sealing of the upper end of the sleeve and then the lower end of the sleeve,
means to force a forming gas into the sleeve under a pressure relatively higher than the pressure of the air in the housing and hood,
an electromagnet supported by the frame adjacent the chuck and adapted when energized to cause the overlapping inner ends of the contacts to be attracted to each other,
means for opening the upper jaws to free the upper contact therefrom, said upper contact being solely supported by the magnetic attraction of the electromagnet with the lower contact,
means operable to move the lower carriage laterally to cause the lower jaws to move the lower contact away from the upper contact after sealing of the upper end of the sleeve therewith to set a given gap between the overlapping ends of the contacts prior to sealing the lower end of the sleeve, and
means to vary the movement of the lower carriage to vary the width of the gap.

9. In an apparatus for assembling switches according to claim 1 having:
means operable to force air under a given pressure into the closed housing and hood,
means for energizing the heating coils at different intervals to first cause sealing of the upper end of the sleeve and then the lower end of the sleeve,
means to force a forming gas into the sleeve under a pressure relatively higher than the pressure of the air in the housing and hood, an electromagnet supported by the frame adjacent the chuck and adapted when energized to cause the overlapping inner ends of the contacts to be attracted to each other, an element adapted to be moved relative to the lower carriage to cause alignment of the gripping jaws to receive their contacts in alignment with each other and to subsequently cause positioning of the lower carriage to locate the lower contact out of alignment with the upper contact as the inner ends of the contacts are moved into the sleeve thereby resulting in the contacts being located in an overlapping relationship, and means for opening the upper jaws to free the upper contact therefrom, said upper contact being supported solely by the magnetic attraction of the electromagnet with the lower contact.

10. In an apparatus for assembling switches according to claim 1 having:

means operable to force air under a given pressure into the closed housing and hood, means for energizing the heating coils at different intervals to first cause sealing of the upper end of the sleeve and then the lower end of the sleeve, means to force a forming gas into the sleeve under a pressure relatively higher than the pressure of the air in the housing and hood, an electromagnet supported by the frame adjacent the chuck and adapted when energized to cause the overlapping inner ends of the contacts to be attracted to each other, an element adapted to be moved relative to the lower carriage to cause alignment of the gripping jaws to receive their contacts in alignment with each other and to subsequently cause positioning of the lower carriage to locate the lower contact out of alignment with the upper contact as the inner ends of the contacts are moved into the sleeve thereby resulting in the contacts being located in an overlapping relationship, said element further being adapted to move the lower carriage laterally to move the lower contact into engagement with the upper contact, and means for opening the upper jaws to free the upper contact therefrom, said upper contact being solely supported by the magnetic attraction of the electromagnet with the lower contact in a predetermined position during sealing of the upper contact to the upper end of the glass sleeve.

11. In an apparatus for assembling switches according to claim 1 having:

means operable to force air under a given pressure into the closed housing and hood, means for energizing the heating coil at different intervals to first cause sealing of the upper end of the sleeve and then the lower end of the sleeve, means to force a forming gas into the sleeve under a pressure relatively higher than the pressure of the air in the housing and hood, an electromagnet supported by the frame disposed adjacent the chuck and adapted when energized to cause the overlapping inner ends of the contacts to be attracted to each other, an element adapted to be moved relative to the lower carriage to cause alignment of the gripping jaws to receive their contacts in alignment with each other and to subsequently cause positioning of the lower carriage to locate the lower contact out of alignment with the upper contact as the inner ends of the contacts are moved into the sleeve thereby resulting in the contacts being located in an overlapping relationship, said element further being adapted to move the lower carriage laterally to move the lower contact into engagement with the upper contact, means for opening the upper jaws to free the upper contact therefrom, said upper contact being solely supported by the magnetic attraction of the electromagnet with the lower contact in a predetermined position during sealing of the upper contact with the upper end of the glass sleeve, and a member adjustably carried by the element and movable with the element for retracting the lower contact jaws laterally to move the lower contact a given distance from the upper contact after de-energization of the magnet and prior to sealing of the lower contact with the lower end of the sleeve.

References Cited by the Examiner
UNITED STATES PATENTS

| 1,461,155 | 7/1923 | Madden et al. | 65—155 X |
| 2,984,046 | 5/1961 | Brewer et al. | 65—276 |
| 3,077,754 | 2/1963 | Ross | 65—40 |

DONALL H. SYLVESTER, *Primary Examiner.*

G. R. MYERS, *Assistant Examiner.*